Oct. 30, 1928.
C. ARNOLD
SPARK PRODUCING TOY WITH CHANGING COLORS
Filed Aug. 1, 1927
1,689,220
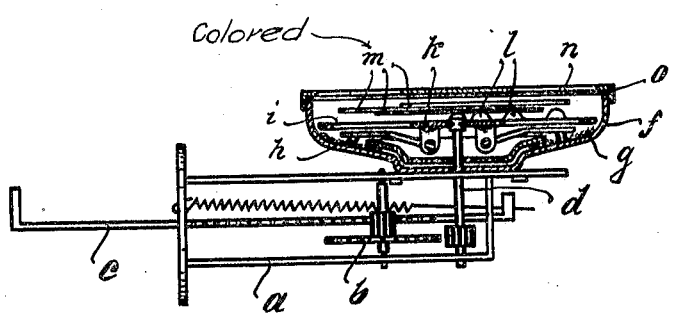
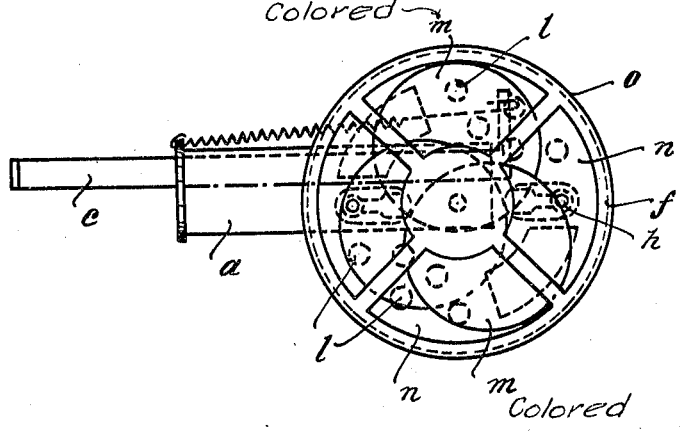
Inventor.

Patented Oct. 30, 1928.

1,689,220

UNITED STATES PATENT OFFICE.

CARL ARNOLD, OF NUREMBERG, GERMANY.

SPARK-PRODUCING TOY WITH CHANGING COLORS.

Application filed August 1, 1927, Serial No. 209,879, and in Germany July 8, 1927.

It has become known to arrange in spark-producing toys above the spark producing mechanism a metal-disk comprising transparent windows of different colors, said metal-disk being loosely mounted on the head of the driving shaft and being slowly rotated by friction from the rapidly rotating spark-producing mechanism so that at certain intervals the coloring of the sparks is altered and changing colors can be seen on the top surface of the toy.

According to the invention the cerium-stone-disk of the spark-producing mechanism, which has apertures through which the sparks pass, has upwardly directed projections designed to support transparent disks of different colors. These transparent disks or panes rest loosely on said projections and slide on the same or are drawn along by the same when the toy is operated, so that they circulate in the direction of rotation of the spark-disk and are braked by the action of the centrifugal force in being pressed against the inner wall of the casing so that the colors of the lighted pictures change rapidly.

An embodiment of the invention is illustrated, by way of example, in the accompanying drawing:

Fig. 1 is a side elevation, partly in section.
Fig. 2 is a top plan view.

The toy consists of a casing $a$, a driving mechanism $b$, a rack $c$ and a shaft $d$. On the casing $a$ for the driving mechanism a casing $f$ is fixed which carries an emery disk $g$. On this emery-disk $g$ slide cerium-stones $h$ fixed on flaps and connected to a disk $k$ mounted on the vertical shaft $d$ and having several apertures $i$ through which the sparks pass.

According to the invention, the disk $k$ has on one portion of its surface upwardly directed projections $l$. On these projections $l$ rest differently colored transparent disks $m$.

When the toy is being operated these transparent disks $m$ are moved by the action of the centrifugal force in outward direction and pressed against the inner wall of the casing $f$ so that their circulating movement is braked and the pictures, which are lighted through these colored disks, change the colors rapidly, these colors being viewed through windows $n$ in a lid $o$ removably mounted on the casing. The lid $o$ serves further to limit the upward movement of the transparent disks $m$ which are lifted by the action of the centrifugal force.

When the lid $o$ has been removed, the transparent disks $m$ which are freely located in the casing can be interchanged.

The transparent disks might be triangular or multicornered and have rounded corners.

I claim:

1. A spark-producing toy with changing colors, comprising in combination with the spark producing mechanism consisting of a driving gear and of a vertical driving shaft, a disk having apertures keyed on said driving shaft, cerium-stones attached to said disc, a casing in which said disk with apertures is located, an emery layer on the inner wall of said casing, a removable lid closing said casing, upwardly directed projections on a portion of said disk with apertures, and colored transparent disks loosely mounted in said casing and resting on said projections so that when said disk having apertures is rapidly rotated said transparent disks are pressed by the action of the centrifugal force against the inner wall of said casing so that their circulating movement is braked and the colored light changes rapidly.

2. In a spark-producing toy as specified in claim 1, the lid having windows through which the lighted colored transparent disks are visible.

In testimony whereof I affix my signature.

CARL ARNOLD.